US010540977B2

(12) United States Patent
White et al.

(10) Patent No.: US 10,540,977 B2
(45) Date of Patent: Jan. 21, 2020

(54) PROXIMITY-BASED ENGAGEMENT WITH DIGITAL ASSISTANTS

(71) Applicant: Microsoft Technology Licensing, LLC, Redmond, WA (US)

(72) Inventors: Ryen William White, Woodinville, WA (US); Russell Allen Herring, Jr., Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 105 days.

(21) Appl. No.: 15/926,894

(22) Filed: Mar. 20, 2018

(65) Prior Publication Data

US 2019/0295551 A1     Sep. 26, 2019

(51) Int. Cl.
| | |
|---|---|
| *G10L 15/22* | (2006.01) |
| *G10L 15/26* | (2006.01) |
| *H04L 29/08* | (2006.01) |
| *H04W 4/021* | (2018.01) |
| *G06F 16/332* | (2019.01) |

(52) U.S. Cl.
CPC ........ *G10L 15/265* (2013.01); *G06F 16/3329* (2019.01); *H04L 67/306* (2013.01); *H04W 4/021* (2013.01)

(58) Field of Classification Search
CPC combination set(s) only.
See application file for complete search history.

(56) References Cited

U.S. PATENT DOCUMENTS

| | | | |
|---|---|---|---|
| 7,925,022 B2 | 4/2011 | Jung et al. | |
| 7,970,870 B2 | 6/2011 | Hinckley et al. | |
| 8,161,369 B2 | 4/2012 | Bhatt et al. | |
| 8,375,299 B2 | 2/2013 | DeLuca et al. | |
| 8,397,153 B1 | 3/2013 | Lee et al. | |
| 9,386,264 B2 | 7/2016 | Dureau | |
| 9,801,219 B2 | 10/2017 | Sonnino et al. | |
| 9,851,935 B1 | 12/2017 | Cohen et al. | |

(Continued)

OTHER PUBLICATIONS

"International Search Report and Written Opinion Issued in PCT Application No. PCT/US19/021724", datd Jun. 12, 2019, 10 Pages.

(Continued)

*Primary Examiner* — Abul K Azad
(74) *Attorney, Agent, or Firm* — Goff IP Law PLLC; Jared Goff

(57) ABSTRACT

A proximity of a first computing device with a second computing device can be detected. In response to the detecting of the proximity, it can be determined that a computer-readable qualification for a type of proactive engagement is met using the detected proximity and possibly a non-proximity state of the first device. The type of proactive engagement can be matched in the computer system with an operation that is programmed to be performed using a computerized natural language digital assistant. In response to the determining that the qualification for the type of proactive engagement is met, the technique can include performing a user engagement action via the second device. The user engagement action can be of a type indicated by the type of proactive engagement. The user engagement action can facilitate a computerized communication session between a computer-readable user profile and the computerized natural language digital assistant.

20 Claims, 7 Drawing Sheets

(56) References Cited

U.S. PATENT DOCUMENTS

| | | |
|---|---|---|
| 2008/0034275 A1 | 2/2008 | Edd et al. |
| 2008/0085689 A1 | 4/2008 | Zellner |
| 2011/0055380 A1 | 3/2011 | Yockey et al. |
| 2014/0273859 A1 | 9/2014 | Luna et al. |
| 2015/0253885 A1 | 9/2015 | Kagan et al. |
| 2016/0127776 A1* | 5/2016 | Zilberstein ............ H04N 21/458 725/34 |
| 2017/0068854 A1 | 3/2017 | Markiewicz et al. |
| 2017/0181645 A1* | 6/2017 | Mahalingam ........ A61B 5/0004 |
| 2018/0005631 A1 | 1/2018 | Lee et al. |
| 2018/0114127 A1 | 4/2018 | Cole et al. |
| 2018/0158156 A1 | 6/2018 | Dintenfass |
| 2018/0322870 A1 | 11/2018 | Lee et al. |
| 2018/0364707 A1 | 12/2018 | Bosworth et al. |
| 2019/0213243 A1 | 7/2019 | Silk et al. |
| 2019/0294452 A1 | 9/2019 | Herring, Jr. et al. |

OTHER PUBLICATIONS

"Pair Google Home Max speakers", Retrieved From: https://support.google.com/googlehome/answer/7559493?hl=en, Retrieved Date: Jan. 14, 2019, 3 Pages.

Fedewa, Joe, "Insignia Smart Speaker gets Speaker Pairing like the Google Home Max", Retrieved From: https://www.xda-developers.com/insignia-speaker-pairing-google-home/, Published Date: Oct. 22, 2018, 11 Pages.

Wagoner, Ara, "How to use Tasker to automate Bluetooth connections", Retrieved From: https://www.androidcentral.com/moto-g6-shouldve-been-android-one-device, Published Date: Sep. 14, 2017, 11 Pages.

"Non Final Office Action Issued in U.S. Appl. No. 15/926,857", dated Aug. 14, 2019, 18 Pages.

Herring, Jr., et al., "Computerized Task Guidance Across Devices and Applications", U.S. Appl. No. 15/926,857, filed Mar. 20, 2018, 63 Pages.

* cited by examiner

PROXIMITY-BASED ENGAGEMENT WITH DIGITAL ASSISTANTS

BACKGROUND

A digital assistant is a computer system component (such as a combination of software and the hardware that the software runs on) that receives natural language input and responds with natural language responses in a dialog. Digital assistants typically can also perform non-dialog actions in response to natural language input commands, such as starting a computer application in response to such a command or providing Web search results in response to such a command.

Currently, when a user engages a digital assistant for a session between the digital assistant and that user's computer-readable profile, the user typically says a key phrase, such as an audible speech phrase that is picked up by a microphone in a device in which the digital assistant is active, or provides a tactile input to a device. Other approaches such as attention-based engagement models have been proposed that build models of where people are attending and apply them to predict engagement. In other applications such as commerce or security, proximity-based services have been deployed.

SUMMARY

The tools and techniques discussed herein can provide usability and efficiency improvements in computer systems that utilize digital assistants. Specifically, the tools and techniques can provide more efficient and user-friendly engagement with a digital assistant, by using detected proximity between multiple devices as well as the state of at least one of the devices to determine that a qualification for a type of proactive engagement is met. In response to this determination, the computer system can trigger a corresponding engagement action by the computer system. For example, the engagement action can be tailored to the type of proactive engagement, which can be one of multiple options for proactive engagement in the computer system. Such tools and techniques can provide a more efficient and user-friendly engagement with a digital assistant.

In one aspect, the tools and techniques can include detecting a proximity of a first device with a second device. The first and second devices can each be a computerized device in a computer system, each having a user interface component. In response to the detecting of the proximity, it can be determined via the computer system that a computer-readable qualification for a type of proactive engagement is met, with the determination using the detected proximity and a non-proximity state of the first device (such as a state of performing a task on the first device). The type of proactive engagement can be one of multiple available computer-readable options for proactive engagements in the computer system. In response to the determining that the qualification for the type of proactive engagement is met, the technique can include generating a user engagement user interface output of a type indicated by the type of proactive engagement. In response to the generating of the output, the technique can include presenting the generated output on the second device via the computerized natural language digital assistant operating in the computer system. The presenting of the generated output can initiate a session with the digital assistant in the computer system.

In another aspect of the tools and techniques, a proximity of a first computing device with a second computing device can be detected. The first and second computing devices can each be a computerized device in the computer system, with each device having a user interface component. In response to the detecting of the proximity, it can be determined that a computer-readable qualification for a type of proactive engagement is met using the detected proximity and a non-proximity state of the first device. The type of proactive engagement can be matched in the computer system with an operation that is programmed to be performed using a computerized natural language digital assistant. In response to the determining that the qualification for the type of proactive engagement is met, the technique can include performing a user engagement action via the second device. The user engagement action can be of a type indicated by the type of proactive engagement. The user engagement action can facilitate a computerized communication session between a computer-readable user profile and the computerized natural language digital assistant in the computer system.

In yet another aspect of the tools and techniques, a proximity of a first computing device with a second computing device in a computer system can be detected. The first and second devices can each have a user interface component. In response to the detecting of the proximity, it can be determined that a computer-readable qualification for a qualified type of proactive engagement is met using the detected proximity. The qualified type of proactive engagement can be one of multiple available computer-readable options for proactive engagements that are matched in the computer system with operations that are programmed to be performed using a computerized natural language digital assistant. The determining that the qualification for the qualified type of proactive engagement is met can include selecting between at least the following types of proactive engagements: a first type of proactive engagement for a first action that is a current user engagement user interface output via the second device, with the first action initiating a computerized communication session between a computer-readable user profile and the computerized natural language digital assistant in the computer system via the second device; and a second type of proactive engagement for a second action that is a preparatory action, which prepares the computer system for the session in anticipation of a subsequent user input action indicating an intent to engage in the session. Also, in response to the determining that the qualification for the qualified type of proactive engagement is met, a user engagement action can be performed via the second device, with the user engagement action being of a type indicated by the qualified type of proactive engagement, and with the user engagement action facilitating the session.

This Summary is provided to introduce a selection of concepts in a simplified form. The concepts are further described below in the Detailed Description. This Summary is not intended to identify key features or essential features of the claimed subject matter, nor is it intended to be used to limit the scope of the claimed subject matter. Similarly, the invention is not limited to implementations that address the particular techniques, tools, environments, disadvantages, or advantages discussed in the Background, the Detailed Description, or the attached drawings.

DETAILED DESCRIPTION

Figure 1:
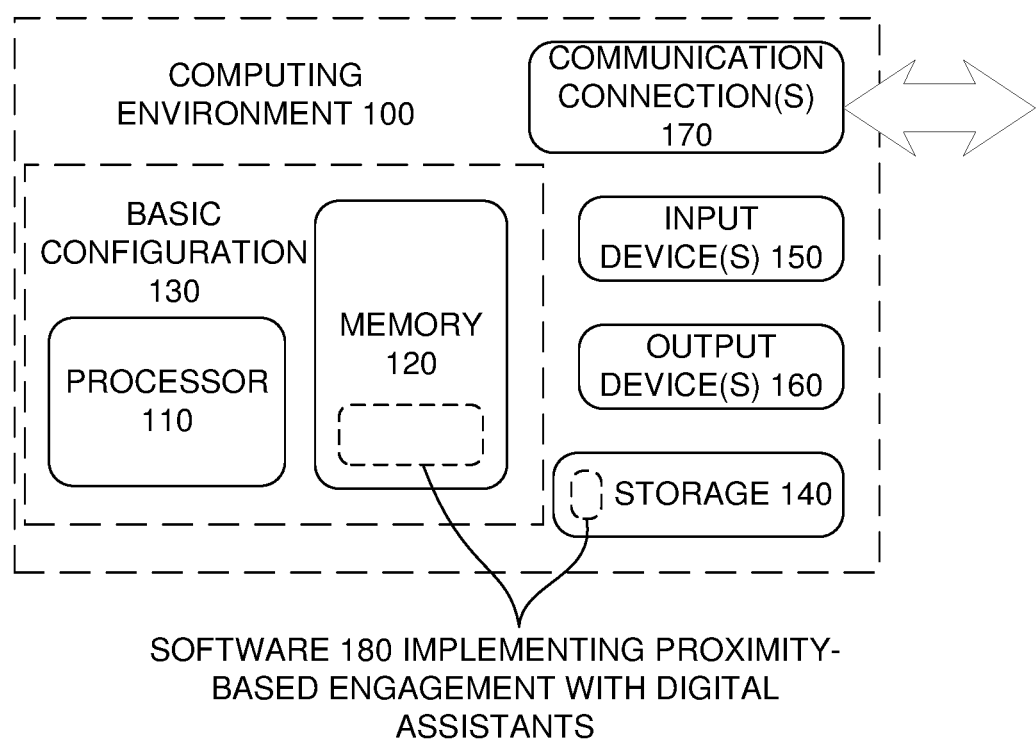
FIG. 1 is a block diagram of a suitable computing environment in which one or more of the described aspects may be implemented.

Aspects described herein are directed to techniques and tools for improved engagement between a user profile and a digital assistant. For example, this can be done by using detected proximity between multiple devices, as well as the state of at least one of the devices to trigger an appropriate and tailored engagement action by the computer system to facilitate a session with the digital assistant. Such engagement tools and techniques may be utilized by the computer system in response to a user merely bringing one device into proximity with another device, where at least one of the devices is running the digital assistant.

Such techniques and tools may include enabling users to initiate and maintain engagement with digital assistants, with the user only needing to bring one device into proximity with another device, where one of the devices is running the digital assistant. Accordingly, the techniques and tools can include: device-based engagement (implicit triggers) with digital assistants; the system detecting whether offering support is possible and appropriate; and basing the support on what is known or can be computed about the current task context.

One aspect of the tools and techniques can include detecting an implicit engagement event. The event can include the juxtaposition of a user's mobile device (smartphone, tablet, laptop, etc.) and a stationary device or other mobile device, where one of the devices is running a digital assistant (such as a stationary device that is an intelligent speaker device) as a trigger for engagement between the user's corresponding user profile and the digital assistant.

Another aspect of the tools and techniques can include using the inferred distance (such as an estimated exact distance, or a grouped distance or range, e.g., immediate/near/far), in some cases along with device motion before being placed next to the stationary device, as factors in a technique to compute a score representing the likelihood of an implicit engagement event occurring (such as the likelihood of an intent to engage with the digital assistant to receive a type of assistance the digital assistant is configured to provide). Such a score can be used to determine whether the qualification for the type of proactive engagement is met. For example, the qualification to be met can be embodied in one or more computer-readable data structures used for testing qualification, such as learning models or qualification rules.

Another aspect of the tools and techniques can include, upon detection of this implicit engagement event, having the digital assistant proactively reach out to users with a user output action such as a request to engage (e.g., via voice with a statement such as "Can I help you with that?"), or a different notification strategy, e.g., LED glow. Beyond voice requests, the device may also start using the screen on the mobile device to present content such as the current task state on the stationary device, such as information about a current song playing on the stationary device.

In another aspect, the tools and techniques can include the system monitoring the current task (e.g., application that is running or web page being viewed) on the user's mobile device and using the information about that task to adapt the proactive engagement action to the current task (e.g., by outputting the sentence "Can I help you cook that?" from one device while another device is displaying a recipe).

Yet another aspect of the tools and techniques can include using what is being displayed on one of the devices, such as a mobile device, as a clue for whether there is an intent to engage with the digital assistant using the other device, such as an intelligent speaker device, and/or whether the agent can help. For example, the system can determine whether the current task is conducive to support (like recipes, if the digital assistant is programmed to help in cooking with recipes) and whether the task is something that the digital assistant can help with (i.e., is it in the digital assistant's skillset?). This can be considered in determining whether a qualification for a corresponding type of engagement is met.

Similarly, in another aspect, the tools and techniques can include using an action or task currently being performed on one of the devices (e.g., the stationary device) to understand whether engagement is likely to be intended at the current time (and thus whether the qualification for a type of engagement is met).

In yet another aspect, the engagement event can be used as a trigger to queue up relevant information for the current task in anticipation of an explicit user request, e.g., finding food preparation videos to accompany a recipe in anticipation of such videos being useful to answer natural language requests posed to the digital assistant. Accordingly, such queuing of information can be at least part of the engagement action that can facilitate a session with the digital assistant.

In yet another aspect, engagement intentions and preferences for a user profile can be learned over time based on previous engagements using machine learning techniques, and the system can facilitate the setting of explicit preferences in response to user input.

Using these aspects of the tools and techniques along with other details discussed herein, an improved computer system with improved digital assistant engagement capability can be provided. For example, using the engagement techniques above, a computer system can determine when to proactively engage the user profile in a session with a digital assistant, with the user's simple action of bringing one device near another device. This can improve the usability of the digital assistant and can also decrease usage of resources such as processing capacity, memory, and network bandwidth by avoiding the need to process an initial initiating natural language command by the user, which is likely followed by another command requesting a particular type of skill or task from the digital assistant. The proactive engagement can also increase the speed in which the system can provide a desired task or skill by the digital assistant, again by avoiding the need to process an initial initiating natural language command by the user, which is likely followed by another command requesting a particular type of skill or task from the digital assistant.

Additionally, by using proximity and possibly other non-proximity state information about the devices to determine whether to perform a proactive engagement action, the system can decrease the occurrence of false positive engagements, where a proactive engagement occurs at an inopportune time. For example, proactively engaging users without considering such factors may lead to a high rate of proactive user outputs when the system is not even technically capable of assisting with a desired task. For example, this may occur when an active task on one of the devices is a task for which the digital assistant is not programmed to help. As another example, this could occur when no task is being performed on either device, or it is not a time when a task would typically be performed on either device. In such situations, a proactive engagement by the computer system can waste computer resources such as processing capability and network bandwidth, in addition to potentially annoying a user and decreasing usability of the system. Such problems can be reduced by accounting for the proximity of the devices in determining whether to trigger a proactive engagement, and such problems can be further reduced by considering non-proximity factors such as state of at least one of the devices (e.g., a task being performed on the device at the time the proximity occurs) when determining whether a qualification for a type of proactive engagement is met, based on device proximity. Accordingly, a system implementing such features can increase its usability and its efficiency compared to systems without such features.

As used herein, a user profile is a set of data that represents an entity such as a user, a group of users, a computing resource, etc. When references are made herein to a user profile performing actions (sending, receiving, etc.), those actions are considered to be performed by a user profile if they are performed by computer components in an environment where the user profile is active (such as where the user profile is logged into an environment and that environment controls the performance of the actions). Often such actions by or for a user profile are also performed by or for a user corresponding to the user profile. For example, this may be the case where a user profile is logged in and active in a computer application and/or a computing device that is performing actions for the user profile on behalf of a corresponding user. To provide some specific examples, this usage of terminology related to user profiles applies with references to a user profile providing user input, receiving responses, or otherwise interacting with computer components discussed herein (e.g., engaging in a session or a dialog between a digital assistant and a user profile).

The subject matter defined in the appended claims is not necessarily limited to the benefits described herein. A particular implementation of the invention may provide all, some, or none of the benefits described herein. Although operations for the various techniques are described herein in a particular, sequential order for the sake of presentation, this manner of description encompasses rearrangements in the order of operations, unless a particular ordering is required. For example, operations described sequentially may in some cases be rearranged or performed concurrently. Moreover, for the sake of simplicity, flowcharts may not show the various ways in which particular techniques can be used in conjunction with other techniques.

Techniques described herein may be used with one or more of the systems described herein and/or with one or more other systems. For example, the various procedures described herein may be implemented with hardware or software, or a combination of both. For example, the processor, memory, storage, output device(s), input device(s), and/or communication connections discussed below with reference to FIG. 1 can each be at least a portion of one or more hardware components. Dedicated hardware logic components can be constructed to implement at least a portion of one or more of the techniques described herein. For example, and without limitation, such hardware logic components may include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc. Applications that may include the apparatus and systems of various aspects can broadly include a variety of electronic and computer systems. Techniques may be implemented using two or more specific interconnected hardware modules or devices with related control and data signals that can be communicated between and through the modules, or as portions of an application-specific integrated circuit. Additionally, the techniques described herein may be implemented by software programs executable by a computer system. As an example, implementations can include distributed processing, component/object distributed processing, and parallel processing. Moreover, virtual computer system processing can be constructed to implement one or more of the techniques or functionality, as described herein.

I. Exemplary Computing Environment

FIG. 1 illustrates a generalized example of a suitable computing environment (100) in which one or more of the described aspects may be implemented. For example, one or more such computing environments can be used as a client device, a peer-to-peer device and/or a server device in a computer system that provides features such as a digital assistant, which can run on one or more such devices. Generally, various computing system configurations can be used. Examples of well-known computing system configurations that may be suitable for use with the tools and techniques described herein include, but are not limited to, server farms and server clusters, personal computers, server computers, smart phones, laptop devices, slate devices, game consoles, multiprocessor systems, microprocessor-based systems, programmable consumer electronics, network PCs, minicomputers, mainframe computers, distributed computing environments that include any of the above systems or devices, and the like.

The computing environment (100) is not intended to suggest any limitation as to scope of use or functionality of the invention, as the present invention may be implemented in diverse types of computing environments.

With reference to FIG. 1, various illustrated hardware-based computer components will be discussed. As will be discussed, these hardware components may store and/or execute software. The computing environment (100) includes at least one processing unit or processor (110) and memory (120). In FIG. 1, this most basic configuration (130) is included within a dashed line. The processing unit (110) executes computer-executable instructions and may be a real or a virtual processor. In a multi-processing system, multiple processing units execute computer-executable instructions to increase processing power. The memory (120) may be volatile memory (e.g., registers, cache, RAM), non-volatile memory (e.g., ROM, EEPROM, flash memory), or some combination of the two. The memory (120) stores software (180) implementing proximity-based engagement with digital assistants. An implementation of proximity-based engagement with digital assistants may involve all or part of the activities of the processor (110) and memory (120) being embodied in hardware logic as an alternative to or in addition to the software (180).

Although the various blocks of FIG. 1 are shown with lines for the sake of clarity, in reality, delineating various components is not so clear and, metaphorically, the lines of FIG. 1 and the other figures discussed below would more accurately be grey and blurred. For example, one may consider a presentation component such as a display device to be an I/O component (e.g., if the display device includes a touch screen). Also, processors have memory. The inventors hereof recognize that such is the nature of the art and reiterate that the diagram of FIG. 1 is merely illustrative of an exemplary computing device that can be used in connection with one or more aspects of the technology discussed herein. Distinction is not made between such categories as "workstation," "server," "laptop," "handheld device," etc., as all are contemplated within the scope of FIG. 1 and reference to "computer," "computing environment," or "computing device."

A computing environment (100) may have additional features. In FIG. 1, the computing environment (100) includes storage (140), one or more input devices (150), one or more output devices (160), and one or more communication connections (170). An interconnection mechanism (not shown) such as a bus, controller, or network interconnects the components of the computing environment (100). Typically, operating system software (not shown) provides an operating environment for other software executing in the computing environment (100), and coordinates activities of the components of the computing environment (100).

The memory (120) can include storage (140) (though they are depicted separately in FIG. 1 for convenience), which may be removable or non-removable, and may include computer-readable storage media such as flash drives, magnetic disks, magnetic tapes or cassettes, CD-ROMs, CD-RWs, DVDs, which can be used to store information and which can be accessed within the computing environment (100). The storage (140) stores instructions for the software (180).

The input device(s) (150) may be one or more of various input devices. For example, the input device(s) (150) may include a user device such as a mouse, keyboard, trackball, etc. The input device(s) (150) may implement one or more natural user interface techniques, such as speech recognition, touch and stylus recognition, recognition of gestures in contact with the input device(s) (150) and adjacent to the input device(s) (150), recognition of air gestures, head and eye tracking, voice and speech recognition, sensing user brain activity (e.g., using EEG and related methods), and machine intelligence (e.g., using machine intelligence to understand user intentions and goals). As other examples, the input device(s) (150) may include a scanning device; a network adapter; a CD/DVD reader; or another device that provides input to the computing environment (100). The output device(s) (160) may be a display, printer, speaker, CD/DVD-writer, network adapter, or another device that provides output from the computing environment (100). The input device(s) (150) and output device(s) (160) may be incorporated in a single system or device, such as a touch screen or a virtual reality system.

The communication connection(s) (170) enable communication over a communication medium to another computing entity. Additionally, functionality of the components of the computing environment (100) may be implemented in a single computing machine or in multiple computing machines that are able to communicate over communication connections. Thus, the computing environment (100) may operate in a networked environment using logical connections to one or more remote computing devices, such as a handheld computing device, a personal computer, a server, a router, a network PC, a peer device or another common network node. The communication medium conveys information such as data or computer-executable instructions or requests in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The tools and techniques can be described in the general context of computer-readable media, which may be storage media or communication media. Computer-readable storage media are any available storage media that can be accessed within a computing environment, but the term computer-readable storage media does not refer to propagated signals per se. By way of example, and not limitation, with the computing environment (100), computer-readable storage media include memory (120), storage (140), and combinations of the above.

The tools and techniques can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various aspects. Computer-executable instructions for program modules may be executed within a local or distributed computing environment. In a distributed computing environment, program modules may be located in both local and remote computer storage media.

For the sake of presentation, the detailed description uses terms like "determine," "determine," "present," "identify," "generate," and "operate" to describe computer operations in a computing environment. These and other similar terms are high-level descriptions for operations performed by a computer, and should not be confused with acts performed by a human being, unless performance of an act by a human being (such as a "user") is explicitly noted. The actual computer operations corresponding to these terms vary depending on the implementation.

II. System with Proximity-Based Engagement with Digital Assistants

In the discussion of the system with proximity-based engagement with digital assistants, note that communications between the various devices and components discussed herein can be sent using computer system hardware, such as hardware within a single computing device, hardware in multiple computing devices, and/or computer network hardware. A communication or data item may be considered to be sent to a destination by a component if that component passes the communication or data item to the system in a manner that directs the system to route the item or communication to the destination, such as by including an appropriate identifier or address associated with the destination. Also, a data item may be sent in multiple ways, such as by directly sending the item or by sending a notification that includes an address or pointer for use by the receiver to access the data item. In addition, multiple requests may be sent by sending a single request that requests performance of multiple tasks.

A. General Proximity-Based Digital Assistant Engagement System

Figure 2:
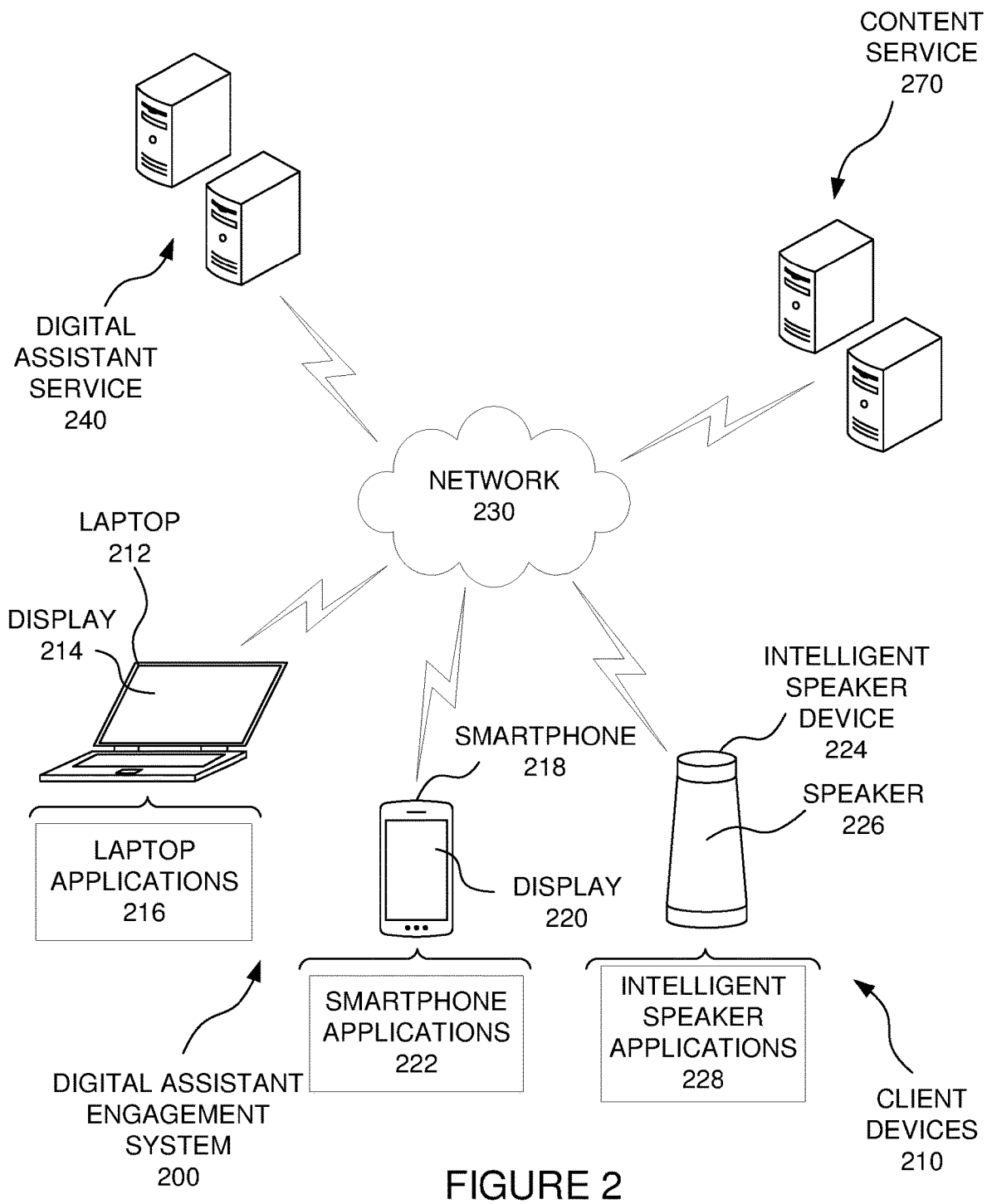
FIG. 2 is schematic diagram of a digital assistant engagement system.

Referring now to FIG. 2, components of a computerized proximity-based digital assistant engagement system (200) will be discussed. Each of the components includes hardware and may also include software. For example, a component of FIG. 2 can be implemented entirely in computer hardware, such as in a system on a chip configuration. Alternatively, a component can be implemented in computer hardware that is configured according to computer software and running the computer software. The components can be distributed across computing machines or grouped into a single computing machine in various different ways. For example, a single component may be distributed across multiple different computing machines (e.g., with some of the operations of the component being performed on one or more client computing devices and other operations of the component being performed on one or more machines of a server).

Referring to FIG. 2, a digital assistant engagement system (200) is illustrated in a client-server configuration to illustrate an example of a system that can be used for the tools and techniques discussed herein. In the client-server configuration shown, the components of the system (200) can include client devices (210), which can run computer applications. For example, the client devices (210) can include a laptop (212) having a display (214) as an output device and running laptop applications (216). The client devices (210) can also include a smartphone (218) having a display (220) as an output device and running smartphone applications (222). As another example, the client devices (210) may include an intelligent speaker device (224) having a speaker (226) as an output device and running intelligent speaker applications (228). Different types of devices can be used with tools and techniques discussed herein. Also, the devices discussed herein can include additional or different components than discussed above. For example, smartphones and laptops typically include speaker output devices, and such devices may include far-field microphones so that they can operate similarly to dedicated intelligent speaker devices.

The digital assistant engagement system (200) can also include a network (230) through which one or more of the client devices (210) can communicate with a digital assistant service (240), which can work with the client devices (210) to host a natural language digital assistant that can include software running on the hardware of one or more of the client devices (210) and the digital assistant service (240).

The system (200) can also include a content service (270), which can provide content, such as Web pages, video content, images, and/or other content to the client devices (210) and/or the digital assistant service (240). The digital assistant engagement system (200) may also include additional components, such as additional search services, content services, and other services that can be invoked by the digital assistant service (240) and/or the client devices (210).

B. Example of a Proximity-Based Digital Assistant Engagement System

Figure 3:
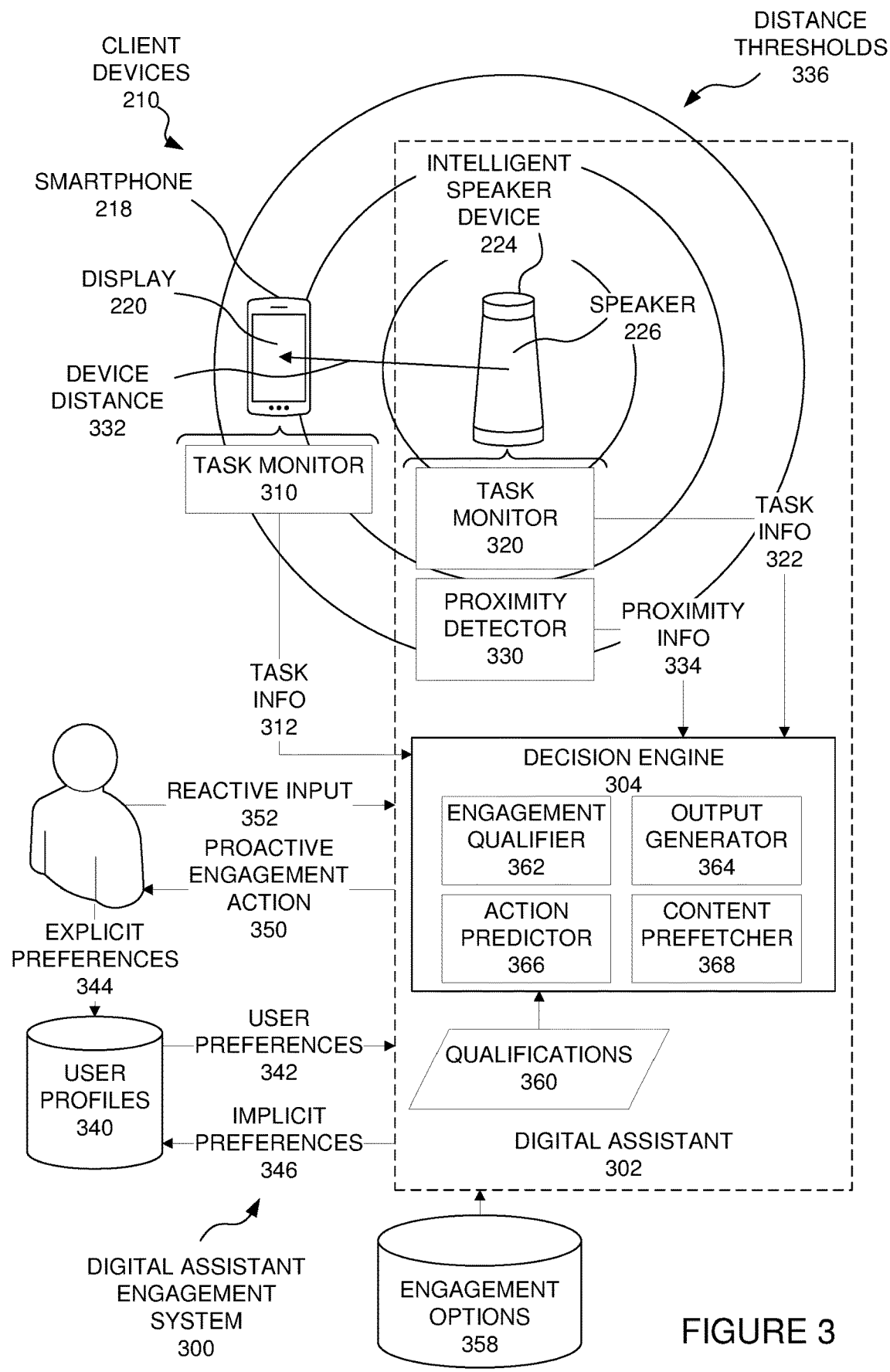
FIG. 3 is another schematic diagram of a digital assistant engagement system.

Referring now to FIG. 3, a schematic diagram illustrates a digital assistant engagement system (300). The digital assistant engagement system (300) of FIG. 3 includes some components from the client-server digital assistant engagement system (200) of FIG. 2 and adds additional illustrations of components and communications. The digital assistant engagement system (300) of FIG. 3 may operate in a client-server configuration like FIG. 2, or in some other configuration (e.g., a peer-to-peer configuration).

The digital assistant engagement system (300) of FIG. 3 can include a digital assistant (302) running in the system. The digital assistant (302) can run in a distributed manner. For example, the digital assistant (302) may include components running in one or more client devices like the client devices (210) of FIG. 2 and in a remote digital assistant service such as the digital assistant service (240) of FIG. 2.

The digital assistant (302) can receive natural language input. For example, the natural language input can be received at a client device such as the intelligent speaker device (224) in the form of audible speaking, or in the form of natural language text entered through a keyboard or other text input device, such as through a touch screen of a smartphone (218). As illustrated in FIG. 3, the digital assistant (302) is operating on the intelligent speaker device (224) and on another set of one or more devices, such as a remote digital assistant service.

In the case of audible input to the digital assistant (302), the input can be processed using a speech-to-text component that can be part of an intent understanding component. The speech-to-text component may use one or more existing speech-to-text processes and may even invoke an existing speech-to-text engine by passing the speech to the existing speech-to-text engine and receiving results from the engine. For example, the speech-to-text component may utilize an existing overall process such as a Hidden-Markov Model-based process, a dynamic time warping process, or a neural network process. The speech-to-text component may also use one or more performance improving techniques, such as context dependency; cepstral normalization; vocal tract length normalization; maximum likelihood linear regression; delta and delta-delta coefficients; heteroscedastic linear discriminant analysis (LDA); splicing and an LDA-based projection followed by heteroscedastic linear discriminant analysis or a global semi-tied co-variance transform; discriminative training techniques; and/or other speech-to-text performance enhancing techniques.

Data representing text of natural language instructions (whether received as text or produced by the speech-to-text component) can be provided to a language understanding component, which can be part of the intent understanding component. As an example, a pre-existing language understanding component may be invoked by passing the natural language text (and, in some cases, other information such as a key and a conversation identifier) to the component with a request to return intents representing the meaning(s) of the natural language text. Different keys and/or application identifiers submitted to the language understanding component may be used for different natural languages, thereby signaling to the language understanding component which language is being used. The language understanding component may include one or more known components for natural language understanding. In one example, the natural language understanding component may use multiclass classification, for example via a neural network with softmax output, multinomial logistic regression, naïve Bayes classification, and other machine learning techniques. More generally, examples of the language understanding component may utilize a lexicon of the natural language, as well as a parser and grammar rules to break each natural language phrase into a data representation of the phrase. The language understanding component may also utilize a semantic theory to guide comprehension, such as a theory based on naïve semantics, stochastic semantic analysis, and/or pragmatics to derive meaning from context. Also, the language understanding component may incorporate logical inference techniques such as by mapping a derived meaning into a set of assertions in predicate logic, and then using logical deduction to arrive at conclusions as to the meaning of the text. Using results of such language understanding techniques, the language understanding component can map the resulting derived meanings to one or more intents, which can be sent to one or more components of the digital assistant (302) and/or to components elsewhere in the digital assistant engagement system (300). For example, such intents can be provided to a decision engine (304), which is part of the digital assistant (302) in the implementation illustrated in FIG. 3. As an example, the decision engine (304) may be running in an online service that is configured to communicate with client devices, such as the digital assistant service (240) discussed above with reference to FIG. 2.

Still referring to FIG. 3, the digital assistant engagement system (300) can include a task monitor (310) running in the smartphone (218) to provide information on the state of the device in which the task monitor (310) is running. The task monitor (310) is illustrated as not being part of the digital assistant (302). However, the task monitor (310) can generate and send task information (312) to the decision engine (304) in the digital assistant (302). For example, the task information (312) can be data indicating one or more states of the corresponding device (the smartphone (218), in this example), such as data that indicates what task is being performed in the smartphone (218) and/or data describing features of that task (e.g., content of a Web page being viewed) Such information can be collected by the task monitor (310) in one or more of various ways, such as using application programming interface calls exposed by an operating system and/or applications running on an operating system in the smartphone (218). Also, in some implementations, the task monitor (310) may be part of the digital assistant (302). For example, the task monitor may be included with a client-side application for the digital assistant (302). Such a configuration is illustrated for a task monitor (320) in FIG. 3, which is running in the intelligent speaker device (224). The task monitor (320) can operate similarly to the task monitor (310), generating and sending task information (322) to the decision engine (304). The task information (322) can include similar information to the task information (312) discussed above.

The digital assistant (302) can also include a proximity detector (330) running in the intelligent speaker device (224). Another proximity detector may be running in the smartphone (218) in addition to or instead of the proximity detector (330) in the intelligent speaker device (224). The proximity detector (330) can collect information on the device distance (332) between the device in which the proximity detector (330) is running and another device that is configured to work with the digital assistant (302) for proactive engagement with the digital assistant (302).

Figure 4:
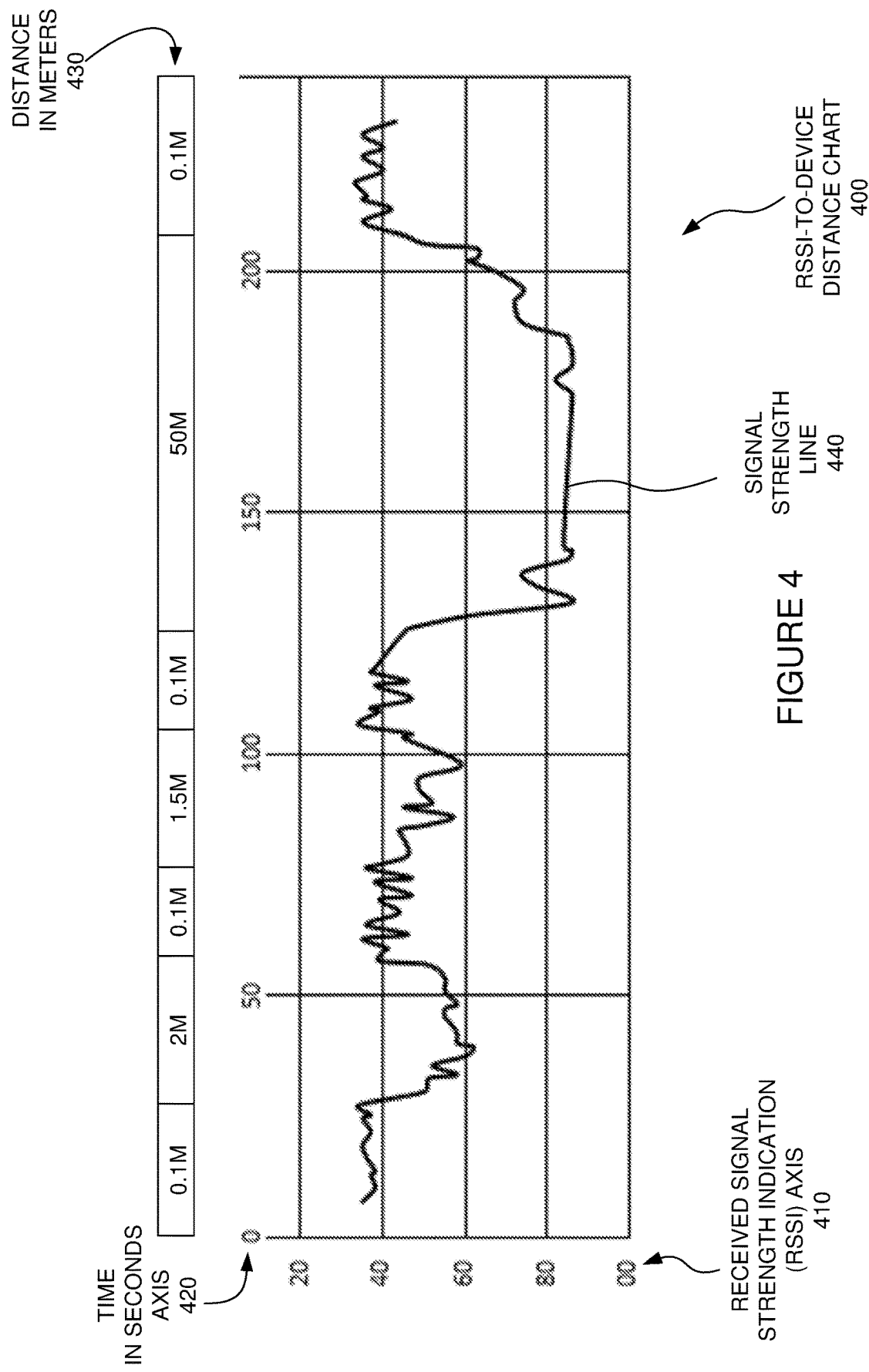
FIG. 4 is diagram of a chart illustrating an example of a relationship between distance between devices and Bluetooth® received signal strength indication.

The proximity detector can operate in different ways. For example, proximity detection may be based on analyzing signals formatted according to protocols, such as with near-field communication, radio-frequency identification, and/or Bluetooth®. The proximity detector (330) can obtain data about signals formatted according to such protocols using application programming interfaces for components running in the intelligent speaker device. As one example, the strength of a Bluetooth® signal between two devices can be used as an indicator of proximity between the devices. FIG. 4 is a received signal strength indication (RSSI)-to-device distance chart (400) illustrating an example of how Bluetooth® signal strength between two devices changes as distance between the two devices changes. In the chart, the vertical axis is a received signal strength indication (RSSI) axis (410), indicating the Bluetooth® received signal strength indication. The horizontal axis is a time in seconds axis (420). Additionally, the chart (400) shows distance in meters (430) for blocks of time. The plotted signal strength line (440) in the chart indicates the strength of the signal as a function of time and as a function of device distance. The distances and other variables in the chart may not be exact—for example, it may have taken some time to move devices from one distance to another. However, the chart (400) illustrates an example of a measurable value, namely Bluetooth® received signal strength indication, that can be used as an indication of distance between two devices.

In using data such as Bluetooth® signal strength to estimate device distance, operations may be performed on the data to improve performance. For example, a smoothing operation may be performed on the signal strength values, such as using a moving average of the signal strength values to estimate distance. The resulting processed values can be monitored to provide an indication that an intent to engage with a digital assistant (302) may be present. For example, a threshold value for received signal strength indication between two devices may be monitored to determine whether it rises above a threshold value, indicating proximity Additionally, such proximity values may be monitored for other indicators of intent to engage. For example, the proximity values prior to the threshold being reached may be monitored. For example, a speed of approach (indicated by a rate of change of the signal strength, shown as the slope of the signal strength line on a chart such as in FIG. 4) may be analyzed for a correlation to previous approach speeds where there was an intent to engage with the digital assistant (302). Other features, such as the environment, room topology, time of day, and/or other features may also be used in conjunction with proximity to indicate an intent to engage with a digital assistant (302).

Referring to FIG. 3, the digital assistant engagement system (300) may include computer-readable user profiles (340), which can be stored and maintained, such as by the digital assistant service (240) and/or other service cooperating with the digital assistant service. The user profiles (340) can include user preferences (342), which can include preferences as to engagement. For example, such preferences may include explicit preferences (344) provided by user input, such as through a client device (such as through the smartphone (218) or the intelligent speaker device (224)). The user preferences (342) may also include implicit preferences (346) that can be inferred from reactive input (352) of the user profile (340) to the computer system in response to proactive engagement actions (350). For example, it may be that the user profile (340) always declines to accept proactive engagement between 5:00 PM (17:00) and 6:00 PM (18:00) because that is a time the corresponding user dedicates to conversing with his/her family and friends. From this, the digital assistant (302) can infer an implicit preference (346) to block any proactive engagement actions (350) during this time. For example, this inference may be achieved by tracking rates of accepting proactive engagement actions (350) by the user profile at particular times of day and detecting a significantly decreased acceptance rate during a particular time block. Similarly, the user profile (340) could provide an explicit instruction to block all proactive engagement actions (350) during that time block, such as by indicating that time block for a "do not disturb" setting in the user preferences (342).

Referring still to FIG. 3, components of the decision engine (304) will now be discussed. In general, the decision engine (304) can operate to determine whether to take a proactive engagement action (350), to analyze types of computer-readable engagement options (358), and to identify engagement options (358) that meet corresponding qualifications (360) for the type of engagement option (358).

Specifically, the decision engine (304) can include an engagement qualifier (362), an output generator (364), an action predictor (366), and a content prefetcher (368). Each of these is discussed below.

The engagement qualifier (362) can determine whether a type of engagement option (358) meets the corresponding qualifications (360) for taking a corresponding proactive engagement action (350), such as a user engagement user interface output as illustrated with the proactive engagement action (350) in FIG. 3. This may include determining whether any engagement option (358) meets qualifications, and if so, it may also include determining which of the multiple available engagement options (350) best meets the qualifications (360). This may be done using the proximity information (334), and it may also include using other computer-readable information, such as the task information (312 and 322), user preferences (342), as well as external information that can be accessed by the engagement qualifier (362), such as time of day as indicated by a computer system clock. Other factors available from computer-readable data may also be considered in addition to and/or instead of these factors.

The qualifications (360) may be in one or more of various forms, such as rule-based qualifications and/or machine-learned qualifications. For example, the rule-based qualifications may have set threshold values of one or more types, such as a proximity value threshold, a proximity speed threshold, time ranges, etc. Rule-based qualifications may also include value comparisons, such as reading a value indicating a particular task is being performed on a device and comparing that value with values in the qualifications (360) for tasks that correspond to available engagement options (358). For example, the qualifications (360) can map a task being performed on a device with an engagement option (358) for starting an engagement that will invoke a particular "skill" or operation the digital assistant (302) is programmed to perform.

In one example, the digital assistant (302) may be programmed to provide natural language guidance for cooking a recipe through the intelligent speaker device (224). If the user profile is viewing a recipe on the display (220) of the smartphone (218), the smartphone (218) is in close proximity to the intelligent speaker device (224) (such with a cross-device signal strength above a threshold value or other indications of the estimated distance being below a threshold value), and the time of day is a time that user preferences (342) indicate as a preferable time to cook, then all these can be considered as indicating the qualifications (360) are met for an engagement option (358) that involves a proactive engagement action (350) for initiating a computer communication session with the digital assistant to provide cooking guidance for the recipe. Thus, the proactive engagement action (350) may be an audible speech output on the intelligent speaker device (224) saying "Let's cook!" If the indications for an intent to engage in the cooking guidance session are not as strong (the device is not as close, it is not a typical time for cooking, and/or there is no recipe currently displayed on the smartphone (218), for example), then a different engagement option (358) for that same session may be selected as meeting the qualifications (360). For example, the audible output speech phrase may be a more tentative phrase, such as, "Do you want to cook?"

In addition to or instead of rule-based qualifications, machine learning qualifications may be used. Such machine learning may include one or more models, such as deep neural networks, which can receive representations of one or more factors, such as those discussed above. For example, available data about the state of the digital assistant engagement system (300), such as the types of data discussed above, can be used to compute one or more vectors. Such vector(s) can be input into one or more machine learning models to form one or more output vectors. The resulting output of the model (such as the one or more vectors) can be compared to expected outputs for one or more different engagement options (358) (such as one or more expected vectors). The similarity of the compared vectors can be used as indicators of intent to engage with the digital assistant (302), thus increasing the likelihood of meeting the qualifications (360) for a corresponding engagement option (358). The model for processing the factors for current situations can be trained using standard training techniques, such as supervised or unsupervised training techniques. For example, backpropagation may be used to train deep neural networks that may be used for identifying whether qualifications (360) are met for one or more engagement options (358).

In one implementation, a vector can be computed for each of one or more engagement options (358). If the proximity information (334) reveals that the estimation of the device distance (332) (such as a signal strength value) indicates the distance is within a distance threshold (336), then a vector analysis of a current task being performed on the smartphone (218) and/or the intelligent speaker device (224) can be analyzed. For example, a vector can also be computed for a task being performed on the smartphone (218), such as by computing a vector using data for what application is being used and/or data representing particular content being presented in that application. The vector for the current task and the vector for the engagement option (358) may be compared. For example, an overlap can be computed between the extracted keywords and entities for the current task and the keywords and entities for the digital assistant's skill associated with the engagement option. As an example, a cosine may be computed between the two vectors (the vector from the task on the smartphone (218) and the vector computed from expected tasks for the engagement option (358) being analyzed) to provide a score that can be used in determining whether the engagement option (358) meets the qualifications (360) for the current state of the digital assistant engagement system (300). That score from the vector comparison may be used alone or with other scores, such as comparisons of other vectors for expected values with vectors computed from current values (e.g., values for an expected time of day). The results of the vector comparisons can be combined if multiple such comparisons are performed (e.g., by performing a weighted addition or multiplication operation, or some other similar combining operation), which can produce an overall score representing an estimation of a likelihood that there is an intent for the engagement option (358) (i.e., whether the corresponding user or user profile intends to engage in the manner represented by the engagement option). Also, if initial qualifications are met for multiple engagement options (358) for an engagement opportunity, then a ranking technique may be used to rank the different engagement options (358). Such a ranking technique can compare scores for the different engagement options (358) using factors based on values, such as those discussed above. The highest scoring engagement option (358) can be considered to be the one engagement option that meets the qualifications (360), where such qualifications (360) can be considered to include a requirement for being the highest-ranking engagement option (358) for an opportunity.

Other techniques may be used in addition to, or instead of the techniques discussed above in determining whether, for a particular state of the digital assistant engagement system (300), the qualifications (360) are met for an engagement option (358).

If the engagement qualifier (362) determines that the qualifications (360) are met for an engagement option (358) that includes an output proactive engagement action (350), then the engagement qualifier can invoke the output generator (364) to generate the particular output, and take the proactive engagement action (350) by sending the output to one or more of the client devices, such as the smartphone (218) and/or the intelligent speaker device (224). For example, this may include generating a natural language dialog script and/or a user interface display, and sending such output to an application on the smartphone (218) or audibly speaking a natural language dialog script with the intelligent speaker device (224). Reactive input (352) may then be received from the user profile (340) via one of the devices (typically the device where the output for the proactive engagement action (350) is presented, but, in some cases, another device) to either confirm or reject the proactive engagement action (350). That confirmation or rejection may be analyzed and used in forming implicit preferences (346) for that user profile, which can then be used for future qualification determinations.

An action predictor (366) can perform similar determinations to those discussed above for the engagement qualifier. However, the action predictor (366) can determine whether qualifications (360) are met for engagement options (358) that involve taking actions now in anticipation of future actions. For example, if the user preferences (342) bar taking a proactive engagement action (350) in the form of an output action now, then the action predictor (366) can determine whether the qualifications (360) are met for taking preparatory actions now in anticipation of a future engagement. This determination of whether qualifications (360) are met can use techniques similar to those discussed above for the engagement qualifier (362). If the action predictor (366) determines that qualifications (360) are met for an engagement option (358), such as an option that involves prefetching content for use in a future action, then the action predictor (366) can invoke the content prefetcher (368) to prefetch content for use in the future action. For example, the content prefetcher (368) may retrieve online content such as Web pages, audio clips, video clips, or images that are commonly requested in a corresponding type of session with the digital assistant.

The operation of the digital assistant engagement system can include collecting, storing, transmitting, and otherwise handling information. In performing such operations, privacy should be considered and respected. For example, the digital assistant engagement system (300) may include opt-in or opt-out settings for user profiles to allow users to control how their information, and especially their personal information, is collected, stored, transmitted, and/or used in the task guidance system. Also, security measures such as data encryption and secure transmissions can be used to protect such information from being inadvertently exposed to third parties. Additionally, operations in the digital assistant engagement system (300) can be limited in accordance with appropriate privacy policies and user profile settings.

C. Example Using the Proximity-Based Digital Assistant Engagement System

A specific example of using the digital assistant engagement system (300) will now be discussed, though many other different examples may be implemented. In this example, a user can place a smartphone (218) next to an intelligent speaker device (224). The digital assistant (302) running on the intelligent speaker device (224) can recognize the smartphone (218), such as based on a unique identifier that pairs the smartphone (218) with the intelligent speaker device (224) (e.g., via a Bluetooth® identifier). Other ways of device recognition may be used instead of such Bluetooth® identification. The digital assistant (302) can regard placement of one device immediately next to another device (as determined from proximity information) as an implicit cue for engagement, in part because the user has done the same thing many times before and those prior engagements have been recorded as implicit preferences (346) for future use, with the implicit preferences being connected to that user's user profile (340) in the digital assistant engagement system (300).

In response to recognizing the proximity cue, the digital assistant (302) can read task information (312) from the smartphone (218) and/or task information (322) from the intelligent speaker device (224). The digital assistant (302) can confirm that the tasks are not tasks for which proactive engagement is blocked. For example, if one of the devices were in the process of finalizing a purchase, that could indicate that engagement was not intended at that time. Instead, the digital assistant (302) may determine that it can assist with the task being performed on the smartphone (218). For example, a recipe may be displayed on the smartphone display (220), and guidance in preparing recipes may be a known skill for the digital assistant (302). The digital assistant (302) can reach out via a proactive engagement action (350), such as a proactive voice request via the intelligent speaker device (224), offering to help prepare the recipe currently displayed on the smartphone display (220). In anticipation of a reactive input (352) accepting the requested help, the digital assistant (302) may proactively fetch resources that can help the user prepare items in the recipe (e.g., videos from an online video service). Upon user acceptance of the offer to help in a reactive input (352), the digital assistant (302) can display content on the smartphone (218), such as a current step in the recipe and additional resources, such as pre-fetched videos.

III. Proximity-Based Digital Assistant Engagement Techniques

Several proximity-based digital assistant engagement techniques will now be discussed. Each of these techniques can be performed in a computing environment. For example, each technique may be performed in a computer system that includes at least one processor and memory including instructions stored thereon that when executed by at least one processor cause at least one processor to perform the technique (memory stores instructions (e.g., object code), and when processor(s) execute(s) those instructions, processor(s) perform(s) the technique). Similarly, one or more computer-readable memory may have computer-executable instructions embodied thereon that, when executed by at least one processor, cause at least one processor to perform the technique. The techniques discussed below may be performed at least in part by hardware logic. Features discussed in each of the techniques below may be combined with each other in any combination not precluded by the discussion herein, including combining features from a technique discussed with reference to one figure in a technique discussed with reference to a different figure. Also, a computer system may include means for performing each of the acts discussed in the context of these techniques, in different combinations.

Figure 5:
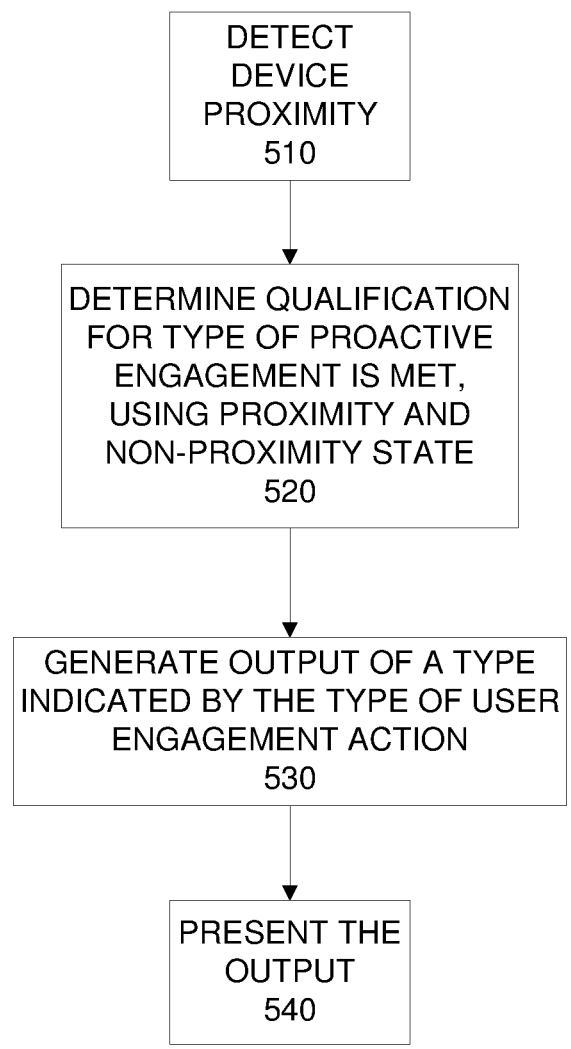
FIG. 5 is a flowchart of a proximity-based digital assistant engagement technique.

A. FIG. 5 Technique

Referring to FIG. 5, a proximity-based digital assistant engagement technique will be discussed. The technique can include detecting (510) a proximity of a first device with a second device. The first and second devices can each be a computerized device in a computer system. The first and second devices can each have a user interface component. Also, each device can be capable of operating independently of the other device. In response to the detecting (510) of the proximity, the technique can include determining (520) that a computer-readable qualification for a type of proactive engagement is met using the detected proximity and a non-proximity state of the first device. Note that a single detection of the proximity may be used to fulfill the proximity detection (510) and the use of the detected proximity in the determining (520) that the qualification is met, if the detected proximity is used in determining that requirements are met (such as determining that a proximity-indicating value is above or below a threshold value indicating sufficient proximity). For example, this qualification determination can include accessing and using computer-readable qualification guidelines (whether set guidelines in a rule-based technique or more variable guidelines in a machine learning technique). The type of proactive engagement can be one of multiple available computer-readable options for proactive engagements in the computer system, such as options for engagement via a digital assistant. In response to the determining (520) that the qualification for the type of proactive engagement is met, the technique can include generating a user engagement user interface output of a type indicated by the type of proactive engagement. In response to the generating (530) of the output, the technique can include presenting (540) the generated output on the second device via the computerized natural language digital assistant operating in the computer system. The presenting (540) of the generated output can initiate a session with the digital assistant in the computer system. Following are some additional features that may be used with this FIG. 5 technique, either alone or in combination with each other.

The first device can be a mobile device, such as a laptop or smartphone, and the second device can be a stationary device, such as a desktop computer or a stationary intelligent speaker device.

The determining (520) that the qualification for the type of proactive engagement is met can use a state of the second device, such as a non-proximity state of the second device.

As an example, the state of the first device can include a task being performed by the first device and the state of the second device can include a task being performed by the second device.

The FIG. 5 technique may further include receiving a user input response to the generated output in the computer system, wherein the user input response confirms the type of proactive engagement.

The technique of FIG. 5 may further include, in response to the determining that the qualification for the type of proactive engagement is met, performing a preparatory action that prepares the computer system for the session in anticipation of a subsequent user input action confirming the type of proactive engagement. For example, such a preparatory action may be indicated as part of the type of proactive engagement, along with the generated output.

The technique of FIG. 5 may further include receiving the subsequent user input action confirming the type of proactive engagement, and using computer-readable data prepared by the preparatory action in conducting the session following the receiving of the user input action confirming the type of proactive engagement.

The state of the first device can include a computerized task being performed using the first device during the detection of the proximity. Also, the session can include using the digital assistant to enhance the task using the second device. For example, if the first device is displaying a recipe, the session with the digital assistant may include the digital assistant providing guidance on cooking the recipe. As an example, this may occur by providing audio or video instructions as guidance in preparing the recipe.

The determining (520) that the qualification for the type of proactive engagement is met can include comparing digital data being used for a task being performed using the first device with digital data matched with the multiple available computer-readable options for proactive engagements in the computer system. For example, this can include exploring the possibility that the digital data being used for the task from the first device matches each of multiple possible proactive engagement options, to determine whether any of them meet qualifications and possibly determining which option has the best ranking.

The session can be between a user profile and the digital assistant, and the determining (520) that the qualification for the type of proactive engagement is met can include accounting for preferences of the user profile that are stored in the computer system. The preferences of the user profile can include implicit preferences inferred by the computer system from past reactions of the user profile to user interface output actions requesting engagement with the digital assistant.

Where the session is a session between a user profile and the digital assistant, the determining that the qualification for the type of proactive engagement is met can include accounting for preferences of the user profile that are stored in the computer system. The preferences of the user profile can include explicit preferences, with the explicit preferences being stored in the computer system in response to user input explicitly requesting the explicit preferences.

Figure 6:
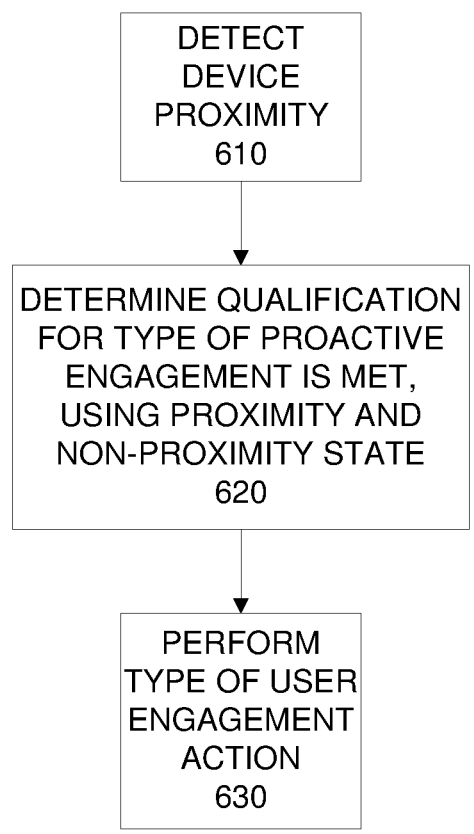
FIG. 6 is a flowchart of another proximity-based digital assistant engagement technique.

B. FIG. 6 Technique

Referring to FIG. 6, another proximity-based digital assistant engagement technique will be discussed. The technique of FIG. 6 can include detecting (610) a proximity of a first computing device with a second computing device. The first and second computing devices can each be a computerized device, with each device having a user interface component such as a microphone and speaker, or a touchscreen. In response to the detecting (610) of the proximity, it can be determined (620) that a computer-readable qualification for a type of proactive engagement is met using the detected proximity and a non-proximity state of the first device. The type of proactive engagement can be matched in the computer system with an operation that is programmed to be performed using a computerized natural language digital assistant. In response to the determining (620) that the qualification for the type of proactive engagement is met, the technique can include performing (630) a user engagement action via the second device. The user engagement action can be of a type indicated by the type of proactive engagement. The user engagement action can facilitate a computerized communication session between a computer-readable user profile and the computerized natural language digital assistant in the computer system. Following are some additional features that may be used with this FIG. 5 technique, either alone or in combination with each other.

The state of the first device can include a computerized task being performed using the first device during the detection of the proximity, and the session can include using the digital assistant to enhance the task using the second device.

The user engagement action can be a user engagement user interface output via the second device, with the user engagement action initiating the session; and/or a preparatory action that prepares the computer system for the session in anticipation of a subsequent user input action confirming the type of proactive engagement.

Accordingly, the technique of FIG. 6 may further include receiving the subsequent user input action; responding to the subsequent user input action by performing a user engagement user interface output via the second device, with the user interface output being part of the session via the digital assistant; and conducting the session using computer-readable data prepared by the preparatory action.

The determining (620) that the qualification for the qualified type of proactive engagement is met can include selecting between at least the following types of available proactive engagements: a first type of proactive engagement for a first action that is a current user engagement user interface output via the second device, with the first action initiating the session; and a second type of proactive engagement for a second action that is a preparatory action, which prepares the computer system for the session in anticipation of a subsequent user input action indicating an intent to engage in the session. The determining (620) may include determining that either type of action, or both types of actions, meet the requirements and are to be performed. Thus, a single engagement option may correspond to a single engagement action or multiple engagement actions.

The determining (620) that the qualification for the type of proactive engagement is met can include comparing digital data being used for a task being performed using the first device with digital data matched with the multiple available computer-readable options for proactive engagements in the computer system.

The determining (620) that the qualification for the type of proactive engagement is met can include accounting for a time of day.

Figure 7:
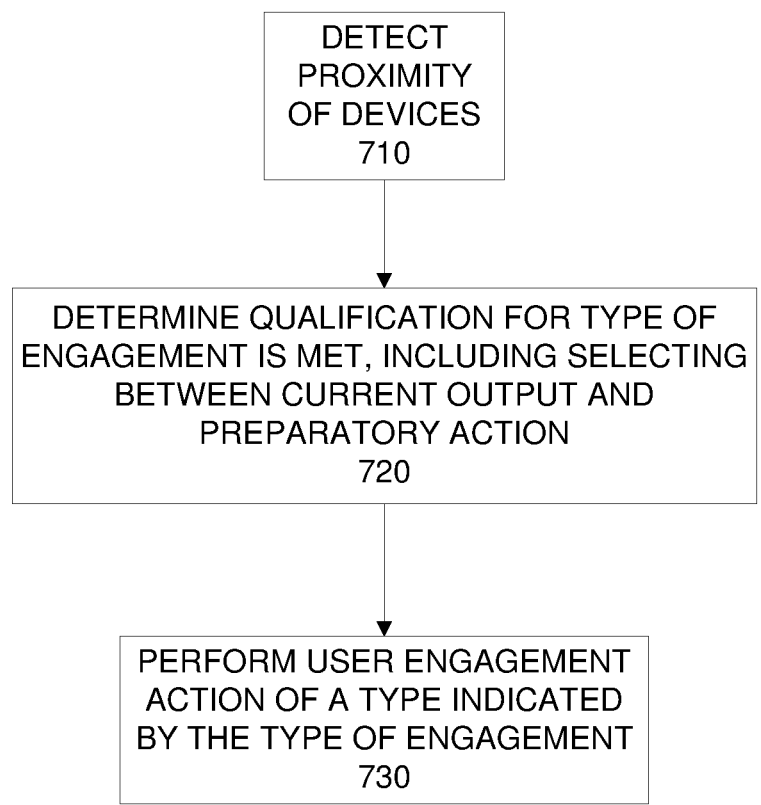
FIG. 7 is a flowchart of yet another proximity-based digital assistant engagement technique.

C. FIG. 7 Technique

Referring to FIG. 7, yet another proximity-based digital assistant engagement technique will be discussed. The technique can include detecting (710) a proximity of a first computing device with a second computing device in a computer system. The first and second devices can each have a user interface component. In response to the detecting (710) of the proximity, it can be determined (720) that a computer-readable qualification for a type of proactive engagement is met using the detected proximity. The type of proactive engagement can be one of multiple available computer-readable options for proactive engagements that are matched in the computer system with operations that are programmed to be performed using a computerized natural language digital assistant. The determining (720) that the qualification for the qualified type of proactive engagement is met can include selecting between at least the following types of available proactive engagements: a first type of proactive engagement for a first action that is a current user engagement user interface output via the second device, with the first action initiating a computerized communication session between a computer-readable user profile and the computerized natural language digital assistant in the computer system via the second device; and a second type of proactive engagement for a second action that is a preparatory action, which prepares the computer system for the session in anticipation of a subsequent user input action indicating an intent to engage in the session. The technique of FIG. 7 can further include, in response to the determining that the qualification for the qualified type of proactive engagement is met, performing (730) a user engagement action via the second device, with the user engagement action being of a type indicated by the qualified type of proactive engagement, and with the user engagement action facilitating the session.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:

1. A computer system comprising:
at least one processor; and
memory comprising instructions stored thereon that when executed by at least one processor cause at least one processor to perform acts comprising:
detecting via the computer system, a proximity of a first device with a second device, with the first device and the second device each being a computerized device, and with the first device having a first user interface component and the second device having a second user interface component;
in response to the detecting of the proximity, determining, via the computer system, that a computer-readable qualification for a type of proactive engagement is met using the detected proximity and a non-proximity state of the first device, with the type of proactive engagement being one of multiple available computer-readable options for proactive engagements in the computer system;
in response to the determining that the qualification for the type of proactive engagement is met, generating, via the computer system, a user engagement user interface output of a type indicated by the type of proactive engagement; and
in response to the generating of the output, presenting the generated output on the second device via a computerized natural language digital assistant operating in the computer system, with the presenting of the generated output initiating a session with the digital assistant in the computer system.

2. The computer system of claim 1, wherein the first device is a mobile device and the second device is a stationary device.

3. The computer system of claim 1, wherein the determining that the qualification for the type of proactive engagement is met uses a state of the second device.

4. The computer system of claim 3, wherein the state of the first device comprises a task being performed by the first device and the state of the second device comprises a task being performed by the second device.

5. The computer system of claim 3, wherein the acts further comprise receiving a user input response to the generated output in the computer system, wherein the user input response confirms the type of proactive engagement.

6. The computer system of claim 1, wherein the acts further comprise, in response to the determining that the qualification for the type of proactive engagement is met, performing a preparatory action that prepares the computer system for the session in anticipation of a subsequent user input action confirming the type of proactive engagement.

7. The computer system of claim 6, wherein the acts further comprise:
  receiving the subsequent user input action confirming the type of proactive engagement; and
  using computer-readable data prepared by the preparatory action in conducting the session following the receiving of the user input action confirming the type of proactive engagement.

8. The computer system of claim 1, wherein the state of the first device comprises a computerized task being performed using the first device during the detection of the proximity, and wherein session comprises using the digital assistant to enhance the task using the second device.

9. The computer system of claim 1, wherein the determining that the qualification for the type of proactive engagement is met comprises comparing digital data being used for a task being performed using the first device with digital data matched with the multiple available computer-readable options for proactive engagements in the computer system.

10. The computer system of claim 1, wherein the session is a session between a user profile and the digital assistant, and wherein the determining that the qualification for the type of proactive engagement is met comprises accounting for preferences of the user profile that are stored in the computer system, with the preferences of the user profile comprising implicit preferences inferred by the computer system from past reactions of the user profile to user interface output actions requesting engagement with the digital assistant.

11. The computer system of claim 1, wherein the session is a session between a user profile and the digital assistant, and wherein the determining that the qualification for the type of proactive engagement is met comprises accounting for preferences of the user profile that are stored in the computer system, with the preferences of the user profile comprising explicit preferences, with the explicit preferences being stored in the computer system in response to user input explicitly requesting the explicit preferences.

12. A computer-implemented method, comprising:
  detecting via a computer system, a proximity of a first computing device with a second computing device, with the first device and the second device each being a computerized device in the computer system, and with the first device having a first user interface component and the second device having a second user interface component;
  in response to the detecting of the proximity, determining, via the computer system, that a computer-readable qualification for a type of proactive engagement is met using the detected proximity and a non-proximity state of the first device, with the type of proactive engagement being matched in the computer system with an operation that is programmed to be performed using a computerized natural language digital assistant; and
  in response to the determining that the qualification for the type of proactive engagement is met, performing a user engagement action via the second device, with the user engagement action being of a type indicated by the type of proactive engagement, and with the user engagement action facilitating a computerized communication session between a computer-readable user profile and the computerized natural language digital assistant in the computer system.

13. The method of claim 12, wherein the state of the first device comprises a computerized task being performed using the first device during the detection of the proximity, and wherein session comprises using the digital assistant to enhance the task using the second device.

14. The method of claim 12, wherein the user engagement action comprising a user engagement user interface output via the second device, with the user engagement action initiating the session.

15. The method of claim 12, wherein the user engagement action is preparatory action that prepares the computer system for the session in anticipation of a subsequent user input action confirming the type of proactive engagement.

16. The method of claim 15, further comprising:
  receiving the subsequent user input action;
  responding to the subsequent user input action by performing a user engagement user interface output via the second device, with the user interface output being part of the session via the digital assistant; and
  conducting the session using computer-readable data prepared by the preparatory action.

17. The method of claim 12, wherein the type of proactive engagement is a qualified type of proactive engagement, and wherein the determining that the qualification for the qualified type of proactive engagement is met comprises selecting between at least the following types of proactive engagements:
  a first type of proactive engagement for a first action that is a current user engagement user interface output via the second device, with the first action initiating the session; and
  a second type of proactive engagement for a second action that is a preparatory action, which prepares the computer system for the session in anticipation of a subsequent user input action indicating an intent to engage in the session.

18. The method of claim 12, wherein the determining that the qualification for the type of proactive engagement is met comprises comparing digital data being used for a task being performed using the first device with digital data matched with the multiple available computer-readable options for proactive engagements in the computer system.

19. The method of claim 12, wherein the determining that the qualification for the type of proactive engagement is met comprises accounting for a time of day.

20. One or more computer-readable memory having computer-executable instructions embodied thereon that, when executed by at least one processor, cause at least one processor to perform acts comprising:
  detecting via a computer system, a proximity of a first computing device with a second computing device, with the first device and the second device each being a computerized device in the computer system, and with the first device having a first user interface component and the second device having a second user interface component;
  in response to the detecting of the proximity, determining, via the computer system, that a computer-readable qualification for a qualified type of proactive engagement is met using the detected proximity, with the qualified type of proactive engagement being one of multiple available computer-readable options for proactive engagements that are matched in the computer system with operations that are programmed to be performed using a computerized natural language digital assistant, and with the determining that the qualification for the qualified type of proactive engagement is met comprising selecting between at least the following types of proactive engagements:

a first type of proactive engagement for a first action that is a current user engagement user interface output via the second device, with the first action initiating a computerized communication session between a computer-readable user profile and the computerized natural language digital assistant in the computer system via the second device; and a second type of proactive engagement for a second action that is a preparatory action, which prepares the computer system for the session in anticipation of a subsequent user input action indicating an intent to engage in the session; and in response to the determining that the qualification for the qualified type of proactive engagement is met, performing a user engagement action via the second device, with the user engagement action being of a type indicated by the qualified type of proactive engagement, and with the user engagement action facilitating the session.

* * * * *